United States Patent [19]

Bärwald et al.

[11] Patent Number: 5,266,337
[45] Date of Patent: Nov. 30, 1993

[54] PROCESS OF PRODUCING A FERMENTATION PRODUCT WITH REDUCED ETHANOL CONTENT

[75] Inventors: Günter Bärwald, Berlin; Herrmann Pilz, Bergfried, both of Fed. Rep. of Germany

[73] Assignee: Moselland e.G., Bernkastel-Rues, Fed. Rep. of Germany

[21] Appl. No.: 650,737

[22] Filed: Feb. 5, 1991

[30] Foreign Application Priority Data

Feb. 5, 1990 [DE] Fed. Rep. of Germany ....... 4003404

[51] Int. Cl.⁵ .............................................. C12G 1/00
[52] U.S. Cl. ...................................... 426/15; 426/11; 426/62
[58] Field of Search .............. 426/61, 62, 15, 16, 426/7, 11, 590, 592, 599

[56] References Cited

U.S. PATENT DOCUMENTS

| | | | |
|---|---|---|---|
| 4,659,662 | 4/1987 | Hsu | 426/16 |
| 4,790,238 | 12/1988 | Hsu | 426/16 |
| 4,882,177 | 11/1989 | Dziondziak | 426/14 |
| 4,929,452 | 5/1990 | Hamdy | 426/16 |
| 5,019,410 | 5/1991 | Pors et al. | 426/15 |
| 5,070,019 | 12/1991 | Hill | 426/15 |
| 5,079,011 | 1/1992 | Lommi et al. | 426/15 |

FOREIGN PATENT DOCUMENTS

| | | |
|---|---|---|
| 0177282 | 9/1985 | European Pat. Off. |
| 0194043 | 2/1986 | European Pat. Off. |
| 0202590 | 5/1986 | European Pat. Off. |
| 8202723 | 2/1982 | PCT Int'l Appl. |
| 8702380 | 10/1986 | PCT Int'l Appl. |

*Primary Examiner*—Joseph Golian
*Assistant Examiner*—Leslie Wong
*Attorney, Agent, or Firm*—Dressler, Goldsmith, Shore & Milnamow, Ltd.

[57] ABSTRACT

The invention relates to a fermentation product with reduced ethanol content from sugar-containing fruit juices or other sugar-containing substrates, which is obtainable by the means that a first partial amount of the substrate having a content in fermentable sugars from 5 to 30% by wt. is treated for fermentation with 0.01 to 5% by weight of yeast (calculated as dry substance) and, if need be, with assimilable nitrogen and/or phosphorus compounds, and treated with 0.1 to 2 volume parts of air or amount of oxygen equivalent to air per volume part and minute, until there has been established in the substrate an ethanol content of 1 to 10% by vol., in particular up to 7.5% by vol.; whereupon a second partial amount of the substrated is dosed in under continued gassing with air or with oxygen.

16 Claims, No Drawings

PROCESS OF PRODUCING A FERMENTATION PRODUCT WITH REDUCED ETHANOL CONTENT

The invention relates to a fermentation product with reduced ethanol content of sugar-containing fruit juices or other sugar-containing substrates.

It is a known practice to produce low-alcoholic and dealcoholized fermentation products by the means that, for example, the fruit juice is divided before the alcoholic fermentation by fractionated crystallization into partial juices with high and low sugar constituent, respectively, and the partial juice with low sugar content is then fermented into a low-alcoholic wine (EP-A-0 177 282).

It is further a known practice, according to other thermal processes to produce wines with lowered ethanol content, for example by freezing (US-A-4 486 407), in which process the frozen-out partial amount is low in ethanol and the liquid partial amount is enriched with ethanol and aromatic substances.

In other thermal processes the ethanol is removed from the finished wine together with the nonpolar aromatic substances dissolved in it as well as with the polar aromatic compounds of similar boiling behavior by distillation under normal pressure or at reduced pressure, as is described, for example in EP-A-0 193 206, DE-A-35 06 820, EP-A-0 070 B45 and DE-A3617654.

Other processes are also known, in which membranes are used for the substance separation, such as, for example the dialysis according to DE-A-36 00 352 or the reverse osmosis in the processes according to EP-A-0 162 240, 0 208 612, 0 202 590 and 0 242 384, in which according to the latter process the ethanol is discharged additionally by organic solvents immiscible with water.

Other processes for the reduction of the ethanol content relate to extraction with carbon dioxide in the supercritical range (EP-A-0 228 572) alone, or as usual in the aforementioned processes, in combination with thermal processes.

The disadvantages of these thermal processes lie in that the finished fermentation product proper, through one or more additional treatment measures undergoes, besides the intended reduction of the ethanol content, also changes of other characteristic ingredients. In the case of thermal processes there is present, inter alia, the danger of hydroxymethylfurfural (HMF) formation, which is an indicator for undesired thermal changes and, in the "boiled taste" (Kochgeschmack), imparts an atypical and undesired character to the finished product.

It is a known practice to achieve a certain reduction of the ethanol content of fermentation products by the means that a constituent of the fermentable sugar, namely the glucose, is reacted, before the start of the alcoholic fermentation by means of yeast-by oxidation by means of added glucose oxidase, as described in EP-A-0 194 043, or by inoculating with gluconobacter oxydans, as is evident from EP-A-0 223 705, into gluconic acid. The gluconic acid arising there must again be removed from the fermentation product, for which purpose there serves the precipitation reaction by means of calcium carbonate. To what extent it is possible by the above-described processes to achieve a reduction of the ethanol content depends directly on the actual content of the fruit juices or substrates used for the alcoholic fermentation in glucose. While apple juice can contain up to 70% of fructose with saccharose present only slightly, even in the case of grape juice, as a rule the fructose contents are higher than those of glucose, so that the reduction of the ethanol content according to these oxidative processes must amount to less than 50% of the ethanol content to be expected in the case of complete fermentation of the fermentable sugars. In the process according to EP-A-0 194 043, in which glucose oxidase is added to the fruit juice (must), up to 96% of the glucose present is oxidized by gassing with air into gluconic acid in which, with applied live culture in gluconobacter oxydans and aeration of the substrate, between 70 and 150 g of glucose per liter is oxidized, while here a part of this sugar is oxidized by the bacteria into gluconic acid and the other part is metabolized by the bacteria in another manner.

The above-mentioned processes for the reduction of the ethanol content of fermentation products with fruit juice (inclusive of grape must) as substrate present with the thermal processes and those on the basis of substance separation by membranes are disadvantageous for the fermentation product by action of heat as well as by removal of aromatic substances with the alcohol fraction. In these processes which proceed from the alcohol-containing product, a special protection from oxidation is to be provided, as is explicity brought out in DE-A-36 17 654, by introduction of an "oxidation preventive device." The known processes for arriving, over the oxidation of glucose, at fermentation products with reduced ethanol content are, in respect to their efficiency, bound to the percentile amount of the glucose in the natural mixture of the sugars of the fruit juice (inclusive of grape must).

DE-A-36 16 093 relates to a process for the production of low-alcoholic or alcohol-free beers, in which the point of departure is an alcohol-containing beer with an alcohol content of about 4%, which still has only a small content in fermentable substances (about 0.25 to 1.0% by wt.). This beer is treated under aerobic conditions with a yeast. A part of the ethanol present evaporates, and the yeast uses a part of fermentable substances present with generation of beer-type aromatic substances and decomposes possibly a further part of the ethanol present. The yeast used, therefore, is capable to produce anew by biosynthesis beer-type aromatic substances expelled with the alcohol, in which process first of all the fermentable substances are respirated and in the process the number of cells is increased. A respiration of ethanol does not take place or takes place only after a relatively long time, since the conversion of the enzyme system takes a very long time.

CH-A-572 520 relates to a process for the production of beer and beerlike fermentation beverages by fermenting of worts, in which the fermentation or a substantial part of the same is conducted aerobically as yeasting, by introducing oxygen or an oxygen-containing gas into the worts during their fermentation. The starting point is a suspension of yeast in mash liquor, to which the worts can be added, i.e., the content in fermentable substances is very low at the beginning of the fermentation and does not appreciably increase in the further inflow of the worts, since the fermentable substances, in consequence of the oxygen excess, are immediately converted into cell substances and breathing metabolism products.

CH-A-602 025 relates to a process for producing low-alcoholic or alcohol-free beverages, especially low-alcohol beer, in which the fermentation of the worts is carried out under aerobic conditions. No data are found on the further conditions.

Underlying the invention is the problem of making available a fermentation product with reduced ethanol content from sugar-containing fruit juices or other sugar-containing substrates, in which the substrate is treated without addition of enzymes or bacteria, without thermal burdening or distillation, separating processes through membranes, or extraction.

Such a fermentation product is obtainable by the means that a first partial amount of the substrate having a content in fermentable sugars from 5 to 30% by wt. is treated for fermentation with 0.01 to 5% by wt. of yeast (calculated as dry substance) and possibly with assimilable nitrogen and/or phorphorus compounds and treated with 0.1 to 2 volumetric parts of air or of an air-equivalent amount of oxygen per volume part of substrate and minute, until an ethanol content of 1 to 10% by vol. especially up to 7.5% vol., has been reached in the substrate; whereupon a second partial amount of the substrate is added under continued gassing with air or with oxygen.

In the first stage there is generated yeast with a high content in respiration-active enzymes, which, surprisingly, in the second stage is capable of respirating alcohol. Further surprising is the fact that the yeast in the second stage, on admixing of the second partial amount of the substrate, hardly continues to grow. The energy requirement of the yeast is covered in the second stage by reason of its high respiration enzyme activity by respiration of ethanol, whereby the ethanol content is reduced. A part of the ethanol is also expelled with air in the gassing. Surprisingly, in the gassing there occur no losses of taste or aroma by oxidation, because the yeast, by reason of its considerably accelerated metabolism continuously generates aromatic substances in higher concentrations. Hitherto, there existed a prejudice against an aerobic fermentation in wine production, because, among other things, of the feared formation of acetaldehyde, acetic acid and other oxidation products.

The first partial amount of the substrate amounts preferably to 20 to 80% by wt., especially 30 to 60% by wt., of the total substrate.

The yeast added in the first stage ordinarily contains already assimilable nitrogen and/or phosphorus compounds. For the acceleration of the yeast growth these compounds, however, are preferably added to the first partial amount of the substrate separately, preferably in amounts from 0.01 to 2% by wt., especially in amounts of 0.03 to 1% by wt.

Preferably the fermentation is carried out (in both stages) at 10 to 400C, especially at 20 to 300C, there being maintained preferably a pH value of 2 to 6, in particular from 2.5 to 4.

The first partial amount of the substrate is treated preferably with 0.5 to 1.5 parts by volume of air or of an amount of oxygen equivalent to air per volume part of substrate and minute. The second partial amount of the substrate is dosed-in under continued gassing with air or oxygen, preferably with a feed rate of 0.5 to 10% by weight, especially to 2 to 8% by wt. (with respect to the total substrate) per hour.

After termination of the dosing-in of the second partial amount of the substrate, for the further reduction of the ethanol content the gassing with air or oxygen can be continued until the fermentable sugars are largely used up.

There can then follow still an anaerobic fermentation, which is especially expedient if a defined ethanol content is to be established, which is in many cases required for reasons of declaration. In the anaerobic fermentation the alcohol content is easily increased; further there takes place a bouquet improvement as well as an acid decomposition, a tartar precipitation and an enrichment in glycerin.

Although the fermentation product of the invention can be obtained from all substrates with fermentable sugars, preferably there are used grape must and fruit juices, which may also be present in an initially fermented (angegorenem) state.

The substrates used are preferably germ-free and, in particular, contain no vinegar bacteria.

The yeasts used according to the invention are known per se (cf., for example, N. H. Dittrich: Mikrobiologie des Weines (Microbiology of Wine), 1977, publ'd by E. Ulmer, Stuttgart; M. Glaubitz/R. Koch: Atlas der Gärungsorganismen (Atlas of Fermentation Organisms), 4th printing 1983, Verlag P. Parey, Berlin and Hamburg). These yeasts were used hitherto either in the anaerobic fermentation (alcoholic fermentation) or in aerobic fermentation (yeast breeding) (cf. for example H. Dellweg: Biotechnologie, 1987, Verlag Chemie, Weinheim). Not known, however, is the capacity of these culture yeasts to re-respirate the ethanol formed in a sugar-containing substrate by supplying of atmospheric oxygen or oxygen in general under limited substrate conditions—i.e, to cover the energy requirement by ethanol. The irreversible oxidation of ethanol into acetic or gluconic acid by special bacteria is known; in the production of the fermentation products of the invention, however, there is hardly formed acetic acid, nor gluconic acid. Also the acetaldehyde which occurs as oxidation product of ethanol in sherry production, an oxidatively proceeding process, is not detectable in the fermentation product of the invention above the smell and taste threshold value of 30 mg/liter.

Preferably there are used according to the invention the fermentable yeasts occurring naturally on fruits and in freshly pressed juices, especially in the form of pure cultures. These yeasts include, for example strains from the genera saccharomyces, schizosaccharomyces, saccharomoycodes, torulopsis and kluyveromyces, the selection, however, not being restricted to these genera or the use of individual species.

It is also possible to use immobilized yeasts. For the immobilization the yeast cells are mixed with a carrier albumin (for example gelatin) and cross-linked with glutaric dialdehyde. Another possibility lies in an inclusion of the cells into a polymer matrix, for example polyacrylamide. In many cases the cells are embedded in natural polymers, such as agar, collagen, kappa-carragene and alginate. The immobilized yeasts have the advantage that they multiply only inappreciably.

In the production of the fermentation products of the invention the fruit juice or another sugar-containing fermentation substrate is filled into a container equipped in the manner of a bioreactor, which contains an aeration or gassing arrangement. The gas distribution in the filling can occur by precompression of the gas with the aid of a compressor, by horizontally or obliquely arranged perforated distribution pipes, by annular conduits or through nozzles in the lower part of the container, in which process the bubbles rise distributed as finely as possible uniformly over the container cross section. Another technique is the gas distribution through a suction system, another is the gas distribution by liquid pumps or by means of moved installations or agitation or in compulsory circulation. The fermentation can also be carried out in an unrestricted manner in a flow-through reactor or in several successively engaged containers for the individual fermentation stages or fermentation sections. In the first phase of the fermentation the fruit juice or the other sugar-containing fermentation substrates, also those which are already in fermentation, are treated with a living yeast culture as well as with organic and/or inorganic assimilable nitrogen and/or phosphorus compounds, such as, for example, yeast extract, or inactivated yeast, ammonium phosphate and ammonium sulfate compounds or other suitable nitrogen-containing compounds, and gassed with air or oxygen. The living yeast culture can consist of a strain culture or of a mixture (mixed culture) of different yeast species. For example, a grape must of 51 degrees Oechsle treated with saccharomyces cerevisiae var. ellipsoideus, a typical wine yeast, as well as with diammonium hydrogen phosphate and yeast extract, was treated at an aeration rate of 0.25 volume parts of air per volume part of liquid and minute, in an agitating fermenter at 25° C. and a pH value of 3.1, in which process after consumption of the assimilable sugars present there was established an ethanol content of 4% by vol. If the aeration was intensified, for example by increasing the throughput to 0.5 vol. parts of air per volume part of liquid and minute, the resultant ethanol content lay at 3% vol. and with further increase of the air throughput at 1 vol. part per vol. part of liquid and minute, only at 2% vol. If, however this grape must was fermented without aeration under the same batch conditions, the ethanol content amounted to 6.7% by vol.

When the proportion of assimilable sugars in the first partial amount of the substrate was used up and the aeration was continued without any further substrate being dosed-in, it was possible to reduce the ethanol content still further. However, there arose oxidation compounds of ethanol detracting from the aroma of the fermentation product, such as acetaldehyde, acetic acid and ester compounds. It was not possible to obtain a wine-typical fermentation product from the aroma profile from the grape must soley by the aeration of the sugar-containing substrates.

For the control of the fermentation the pH value of the fermentation material is adjusted in general to 2.0 to 6.0, preferably to 2.5 to 4, whereupon the fruit juice or another sugar-containing fermentation substrate or the corresponding products already under fermentation are maintained by temperature control at fermentation temperatures of 10° to 40° C., preferably from 15° to 32° C. Temperatures below 10° C. retard the fermentation speed and those above 40° lead, in the case of some yeasts, to a loss in activity. At higher fermentation temperatures easily volatile aroma substances involved in the bouquet can be expelled.

In the second stage (inflow phase) the gassing with air, preferably in an amount of 0.25 to 1.25 vol. parts per vol. part of substrate and minute, occurs in general until an ethanol content between 0.1 and 10% vol., preferably 1 to 5% by vol. has been established.

The yeast is then largely separated from the fermentation product according to conventional processes, for example by separating or siphoning from the sediment. The yeast residue remaining in the fermentation product brings about, if desired, the subsequent after-fermentation if the ethanol content is to be set at a certain value. This stage is conducted anaerobically. If the anaerobic after-fermentation is to be intensified, then there can again be added to the fermentation product a small amount of sugar-containing fruit juice and/or another sugar-containing fermentation substrate.

The fermentation product of the invention has the advantage over other fermentation products with reduced ethanol content, that the accompanying substances which are newly formed in the yeast metabolism are largely spared. Further, there remain the typical aroma substances arising in the fermentation as well as the aroma substances originating from the sugar-containing fruit juices and from the other sugar-containing fermentation substrates, as well as the glycerin as non-volatile metabolism product of the yeasts. For the production of the fermentation products according to the invention no higher temperatures, as well as solvent extractions and other complicated and expensive process steps are required, which lead to a loss in other metabolism products of the yeast besides ethanol.

The fermentation products of the invention can be used as such or as intermediate products for the production of sparkling wine, fruit sparkling wine, wine-containing and/or wine-like beverages with and without carbon dioxide.

An object of the invention is, further, the use of the yeast occurring in the production of the fermentation product of the invention for pharmaceutical and dietetic purposes. This advantageous use is due to the high content of the yeast in respiration enzymes.

The invention is explained by the following examples in conjunction with a comparative example.

COMPARATIVE EXAMPLE 1 liter of grape sweet must with the following analytical data:
Density: 1.051 g/cm$^3$ (20° C.);
Fermentable hexoses: 116.1 g/ltr, in which glucose—54.9 g/ltr; Fructors - 61.2 g/ltr;
pH value 3.07;
Ethanol present: 1.0 g/ltr (slightly fermented grape sweet must) was treated in each case with 0.2 g/ltr yeast (calculated as dry mass) from a pre-culture or as dry yeast (lyophilisate), and fermented at 25°±0.5° C. in correspondence to the variants A to G given below.

The control analyses for the determination of ethanol, glucose and fructose were performed by means of enzymatic methods (Boehriger test combination) and the sugars were additionally determined according to the HPLC method.

Variant A (classical process without reduction of the ethanol content)

The fermentation was carried out anaerobically as static culture up to the final fermentation. The final fermentation was achieved after 160 hours, the ethanol content amounted to 6.66% by vol. and the pH value to 2.95; the control for residual sugar turned out negative, the density at the end of the fermentation was 1.012 g/cm$^3$. The yeast mass calculated as dry mass, amounted at the end of the fermentation to 0.8 g/ltr.

Variant B (classical process without reduction of the ethanol content, with "fermentation-salt" addition)

To the grape sweet must there were added:
0.25 g of yeast autolyzate dry mass (contains 0.6 mg/lt vitamin B);
0.3 g diammonium phosphate.

The batch amounted to 1 liter. The fermentation, as in variant A, was carried out anaerobically as static culture up to the final fermentation. The final fermentation was achieved after 132 hours. The ethanol content was 6.77% vol., the pH value 2.95. The control for residual sugar turned out negative. The density at the end of the fermentation was 1.012 g/cm$^3$. The yeast mass, calculated as dry mass, amounted at the end of the fermentation to 1.0 g/ltr.

Variant C (reduction of the ethanol content by gassing with air; no additional dosing of substrate)

The composition of the fermentation substrate was the same as in variant A. The aeration was carried out with 1 volume part of air per volume part of liquid and minute. After 25 hours of aeration an ethanol content of 2.9% by vol. was established; the pH value was 2.5 and the density 1.027 g/cm$^3$. Since fermentable sugars were still present, the aeration was extended until the sugars were completely used up. This point was reached after 42 hours. Then an ethanol content of 1.7% by vol. was established, the pH value was constant at 2.5, and the density amounted to 1.010 g/cm$^3$. The yeast mass after complete consumption of the sugars (calculated as dry mass) was 2.2 g/ltr.

The fermentation product obtained tasted yeasty and had a high acetaldehyde content, which had to be caught up by addition of $SO_2$. The aroma intensity was clearly less than that of the fermentation product according to variant A.

By the gassing, therefore, a part of the ethanol as well as most of the aroma substances were expelled.

Variant D (strictly anaerobic fermentation)

The combustion of the fermentation substrate was the same as in variant A, but the fermentation substrate was treated strictly anaerobically, i.e. gassed with nitrogen already before the yeast addition. The gassing rate was established as in variant C with 1 volume part of air per volume part of liquid and minute. The analytical data were determined after 25 hours of gassing and showed an ethanol content of less than 1 g/ltr with a pH value of 3.0 and an unchanged density of 1.051 g/cm$^3$. This means that no alcoholic fermentation had come about.

The comparative example makes it clear that, in the first place, the fermentation performance of the yeast is severely inhibited in the pure nitrogen milieu (variant D) and, in the second place, that this physical treatment does, to be sure, lead to a certain reduction of the ethanol content dependent on the ethanol starting concentration, which (reduction), however is not restricted to this but includes all the volatile compounds in the gas stream (variant C), whereby, finally, the fermentation product is impoverished in valuable and quality-determining bouquet substances and finally loses its quality.

In contrast, in the production of the fermentation products according to the invention the unavoidable loss in bouquet substances in the passing through of air or oxygen is compensated by the fermentation substrate treated with yeast, by the means that through the yeast metabolism excited, there constantly arise new aroma substances, of which only a part is expelled together with the ethanol.

From the comparative test according to variant C it becomes clear that a reduction of the ethanol content from 6.7% by vol. to 2.9% by vol. in the most favorable case is to be achieved after 25 hours of aeration. Under consideration of the mean expulsion effected determined by other tests here not explained in detail, of about 1.4% vol. ethanol, 5.3% vol. of ethanol is otherwise removed, in which simultaneously the formation of further ethanol is prevented because of the using-up of the still present sugars. Probably in the aerobic process conduction a large part of the fermentable sugars is respirated by the yeast.

In the following examples there is explained the production of some fermentation products according to the invention.

EXAMPLE 1

The analytical data for the grape sweet must used correspond to those of the comparative example. 250 ml of sweet must were treated with 0.2 g of yeast, calculated as dry mass, 0.25 g of freshly prepared wine yeast autolyzate, calculated as dry mass (as source for nitrogen and vitamin $B_1$) and 0.3 g of diammonium phosphate. As in the comparative example, fermentation was carried out at 25° C., and the aeration was performed with 1 volume part of sterile air per volume part of the actual liquid amount and minute, analogously to variant C of the comparative example, in which process after a fermentation time of 25 hours the ethanol content was established at 3.9% vol., the density at 1.015 g/cm$^3$ and the pH value at 2.95.

Thereupon 200 ml of grape sweet must were dosed in without further additives over a period of 24 hours. The aeration was adapted to the actual liquid volume in the fermenter. The inflow rate of 200 ml of sweet must/24 hrs. was retained up to the end volume of 1.0 liter. After a fermentation time of 72 hours an equilibrium state of 1.1% vol. of ethanol at a pH value of 2.9 was established; this equilibrium state was also characterized in that the amounts of glucose and fructose introduced with the sugar-containing substrate were directly respirated by the yeast, without the ethanol content being raised. The fermentation product freed from the yeast had, even without anaerobic after-fermentation, already a wine-typical aroma note.

EXAMPLE 2

800 liters of grape sweet must, density=1.059 g/cm$^3$, containing 5.52% by wt. of glucose and 6.06% by wt. of fructose were treated with 0.7 kg of dry wine yeast, 1.34 kg of diammonium phosphate and 1.75 kg of autolyzed yeast (30% dry mass) and gassed at 22° to 26° C. with 1 volume part of sterile air per volume part of liquid and minute after a preceding rehydration phase of the dry yeast for 24 hours. 1600 liters of grape sweet must where then dosed-in within 106 hours with retention of the aeration rate of 1 volume part of air per volume part of actual liquid amount and minute. 10 hours after the end of the dosing-in the ethanol content amounted to 1.8% by vol. at a density of 1.014 g/cm$^3$ and a pH value of 2.90.

For the further reduction of the ethanol content the fermentation was continued without dosing-in of sweet must for altogether 35 hours at a reduced aeration rate of 0.5 volume parts of air per volume part of liquid and minute under the same temperature conditions. The ethanol content of the fermentation product then amounted to 0.3% vol. at a density of 1.006 g/cm$^3$ and a pH value of 2.90. Fermentable sugars could no longer be detected. The yeast was separated from the fermentation product and the fermentation product, under addition of 0.5 g of dry yeast/100 ltrs and of the proportionately required sweet must was subjected to an anaerobic after-fermentation for the achievement of a defined ethanol content.

The fermentation product had a wine-typical aroma.

EXAMPLE 3

800 liters of grape sweet must, density = 1.065 g/cm³, containing 6.3% of glucose and 6.6% of fructose, were treated with 0.7 kg of dry wine yeast, 1.75 kg of diammonium phosphate and 1.75 kg of autolyzed yeast (30% dry mass) and gassed in a fermenter at 23 to 25° C. with 1 volume part of sterile air per volume part of liquid and minute after a preceding rehydration phase of the dry yeast, for 18 hours. At this point the ethanol content amounted to 4.6% vol. with a density of 1.020 g/cm³.

Thereupon 600 liters of grape sweet must were dosed in within 36 hours under maintenance of the aeration rate of 1 volume part of air per volume part of actual liquid amount and minute. At the end of the dosing-in the ethanol content was 3.5% vol. at a density of 1.015 g/cm³ and a pH value of 2.75.

For the further-going reduction of the ethanol content the fermentation was continued without dosing-in of sweet must for 43 hours more with a lowered aeration rate of 0.5 volume parts of air per volume part of liquid and minute under the same temperature conditions. After this the fermentation product still had an ethanol content of 1.2% vol. at a density of 1.010 g/cm and a pH value of 2.84; fermentable sugars were no longer detectable. The yeast was separated from the fermentation product, and the fermentation, under addition of 0.2 liters of liquid harvest yeast/100 ltr and of the proportionately required sweet must for the achievement of a defined ethanol content was subjected to an after-fermentation.

The fermentation product had a wine-typical aroma.

When the above-indicated starting sweet must was subjected to a classical stationary anaerobic final fermentation, its ethanol content amounted to 8.1% vol.

What is claimed is:

1. A process of producing a fermentation product with reduced ethanol content from a substrate consisting essentially of sugar-containing fruit juice having a content of fermentable sugars from 5 to 30% by wt., which comprises the steps of (a) treating a first partial amount of the substrate for fermentation with 0.01 to 5% by wt. of yeast, calculated as dry substance and with 0.1 to 2 volume parts of air or the amount equivalent to air of oxygen per volume part of substrate and minute, until an ethanol content from 1 to 10% vol. has been established in the substrate; and (b) thereafter adding a second partial amount of the substrate, comprising the remainder of the total substrate to the first partial amount of substrate while continuing the treatment with air or with oxygen.

2. The process according to claim 1, wherein the first partial amount of the substrate amounts to 30 to 60% by wt. of the total substrate.

3. The process according to claim 1, wherein the first partial amount of substrate is supplemented with at least one compound selected from the group consisting of assimilable nitrogen and phosphorus compounds in amounts from 0.01 to 2% by wt.

4. The process according to claim 1, wherein the fermentation is carried out at from 10° to 40° C., and a pH value of from 2 to 6.

5. The process according to claim 2, wherein the first partial amount of the substrate is treated with 0.25 to 1.5 volume parts of air or the amount of oxygen equivalent to air of oxygen per volume part of substrate and minute.

6. The process according to claim 2, wherein the second partial amount of the substrate is added at an addition rate of from 0.5 to 10% by wt., with respect to the total substrate, per hour.

7. The process according to claim 1, wherein the treatment with air or oxygen is continued after termination of the adding of the second partial amount of the substrate, until the fermentable sugars are largely consumed, for the further reduction of the ethanol content.

8. The process according to claim 2, wherein the adding of the second partial amount of the substrates is followed by an anaerobic fermentation.

9. The process according to claim 1, wherein the yeast is selected from the group consisting of the genera Saccharomyces, Schizosaccharomyces, Saccharomycodes, Torulopsis, and Klyveromyces.

10. The process according to claim 2, wherein the first partial amount of substrate is treated with 0.1 to 2 volume parts of air or the amount equivalent to air of oxygen per volume part of substrate and minute, until an ethanol content from 1% to 7.55 by vol. has been established in the substrate.

11. The process according to claim 2, wherein the first partial amount of substrate is supplemented with at least one compound selected from the group consisting of assimilable nitrogen and phosphorus compounds in from 0.03 to 1% by wt.

12. The process according to claim 2, wherein the fermentation is carried out at from 20° to 30° C. and a pH value of from 2.5 to 4.

13. The process according to claim 2, wherein the second partial amount of the substrate is added at an addition rate of from 2 to 8% by wt., with respect to the total substrate, per hour.

14. The process according to claim 1 wherein said sugar containing fruit juice is grape must.

15. The process according to claim 1 wherein said fruit juice is free of vinegar bacteria.

16. The process according to claim 1 wherein said yeast is immobilized.

* * * * *